June 2, 1953 — R. BERNEGGER — 2,640,354
TESTING APPARATUS FOR TESTING THE FADING CHARACTERISTICS OF TEXTILE MATERIAL
Filed March 15, 1950 — 3 Sheets-Sheet 1

INVENTOR.
Rolf Bernegger
BY
ATTORNEY

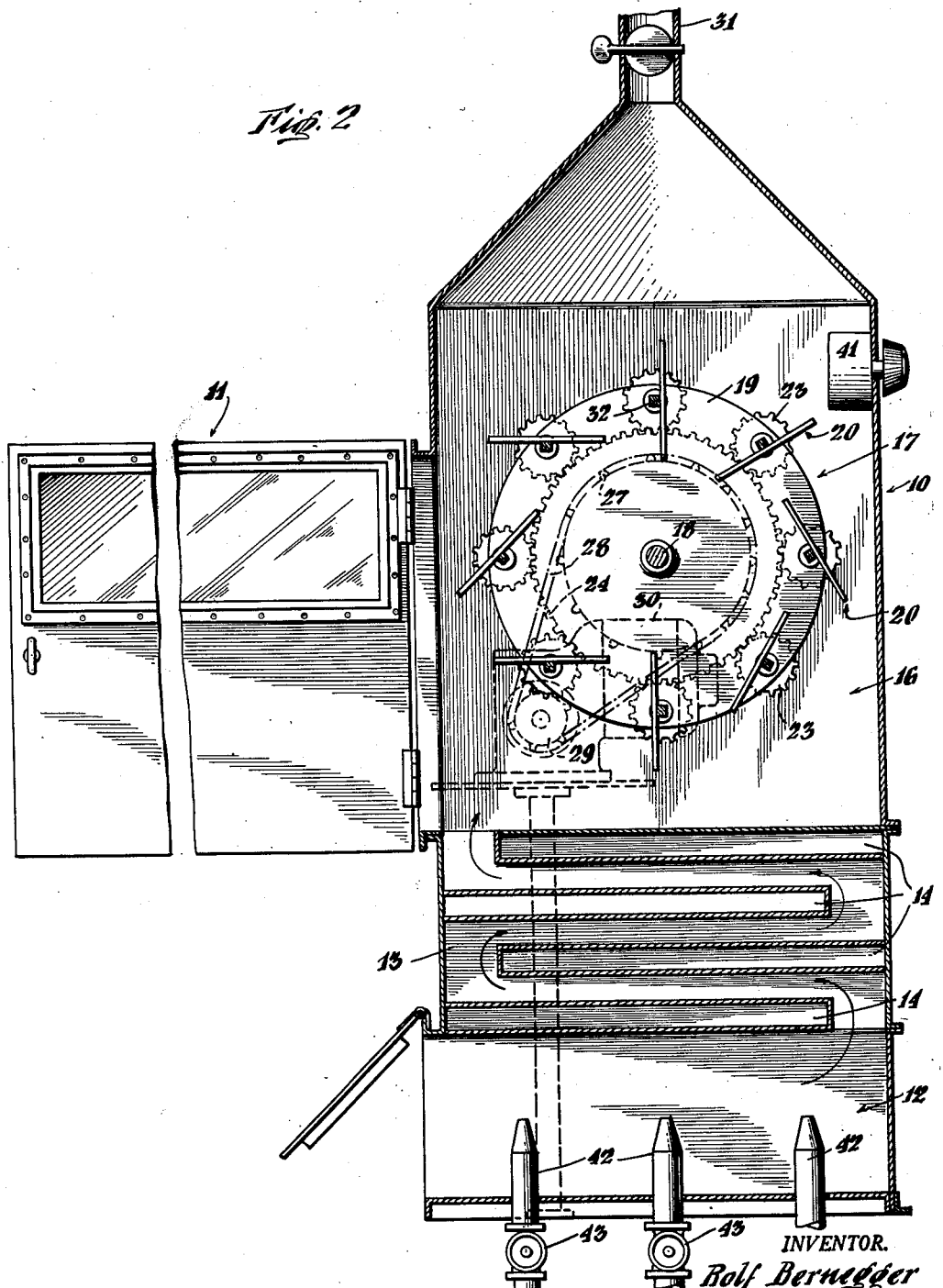

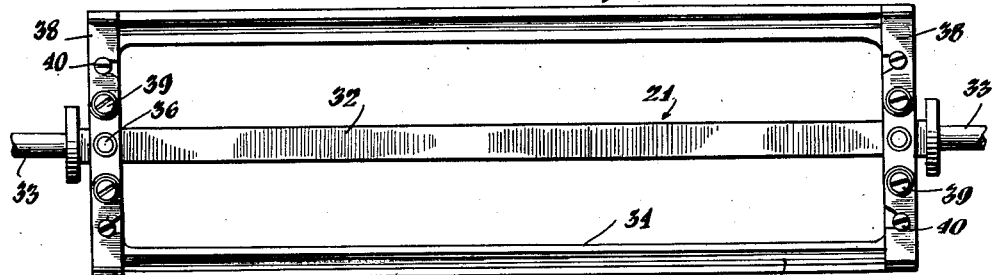
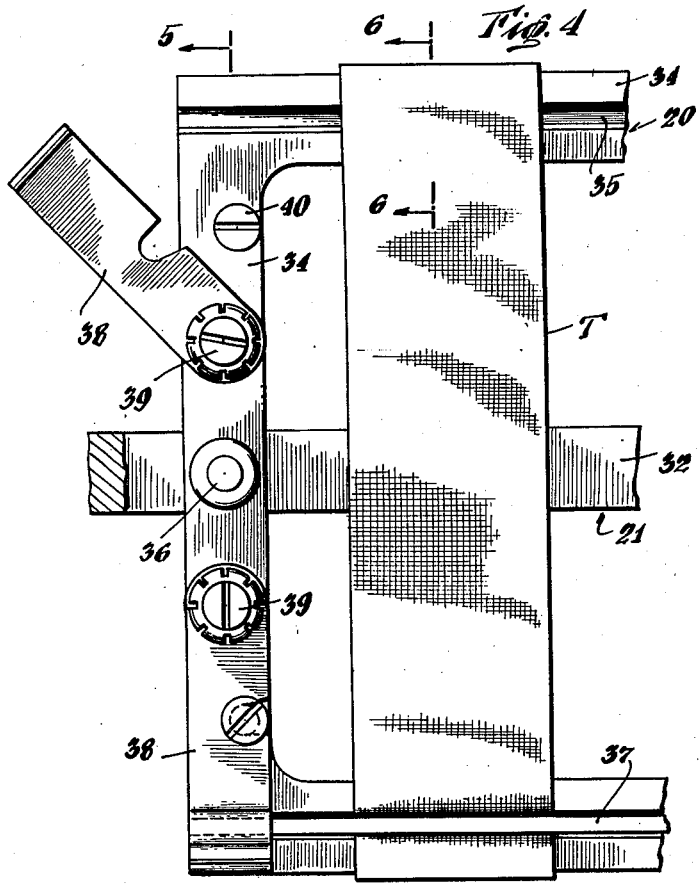
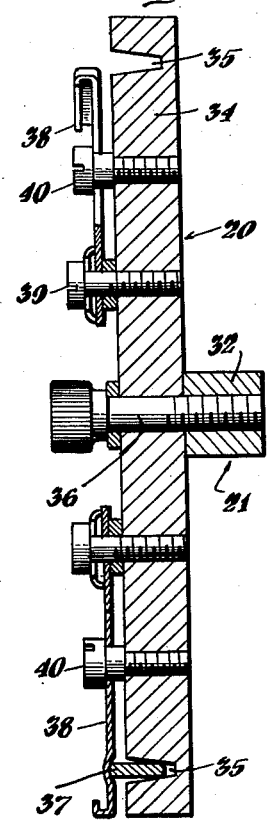
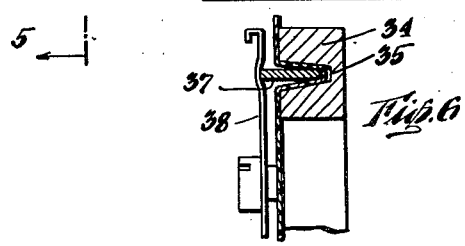

Patented June 2, 1953

2,640,354

UNITED STATES PATENT OFFICE 2,640,354

TESTING APPARATUS FOR TESTING THE FADING CHARACTERISTICS OF TEXTILE MATERIAL

Rolf Bernegger, Hawthorne, N. J., assignor to Cliffside Dyeing Corp., Paterson, N. J., a corporation of New Jersey Application March 15, 1950, Serial No. 149,712

9 Claims. (Cl. 73—159)

This invention refers to a testing apparatus for testing textiles for atmospheric gas fading.

With the inception of cellulose acetate rayon as a textile fibre, a new type of color fading was observed. This color fading became known as "Atmospheric Gas Fading." The cause of this fading was found to be the presence of oxidizing gases in the atmosphere, especially in large industrial cities. These gases are the products of combustions of all kinds, for example gas burners, power plants, automobile exhausts, chemical plants, and the like.

It became increasingly important to measure the resistance of dyed acetate rayon fabrics to the attack of these gases and various kinds of laboratory equipment have been designed for this purpose.

The underlying principle of all of these testing methods is the exposure of samples of the fabrics to be tested to the action of either chemically produced gases or in most cases to the action of the products of combustion obtained by burning illuminating gas. This was achieved in apparatuses of various designs. The prior art lacked uniformity of exposure of samples tested at the same time. Previously samples were exposed in a chamber on a stationary frame. Rotating sample carriers were used, which rotated the samples around a vertical axis. Such means failed to insure proper and equal exposure of all samples being tested.

The major difference between the prior art and my invention is in the arrangement of the sample carriers. In operation, these sample carriers revolve around their own horizontal axes and are mounted on the periphery of a rotating carrier, said rotating carrier also revolves around its own horizontal axis. The revolving motion being in predetermined cycles, alternatingly clockwise and counterclockwise in rotation, thus giving each individual sample the same exposure to the surrounding gases on both sides and at the same time mixing the gases to insure uniform fading action on all the samples.

The gases are made by burning combustible gases or in any other desired manner. These gases are introduced over the whole width of a reaction chamber through a system of ducts. The temperature of the gases may be thermostatically controlled by blowing air over the duct system or by other means. Thereafter said gases escape through a suitable flue.

Referring to the drawings:

Figure 2 is a view in vertical section on the line 2—2 of Fig. 1;

Figure 3 is a detailed elevational view of a testing frame;

Figure 4 is an enlarged fragmentary view of a part of the testing frame shown in Fig. 3 with one of the samples of textiles to be tested shown in place;

Figure 5 is a cross-section on line 5—5 of Fig. 4 showing the clamping mechanism used to clamp the samples of textiles to be tested on to the frame; and Figure 6 is a fragmentary detailed cross-section on the line 6—6 of Fig. 4 illustrating the clamping bar used to clamp the samples of textiles to be tested.

Figure 1:
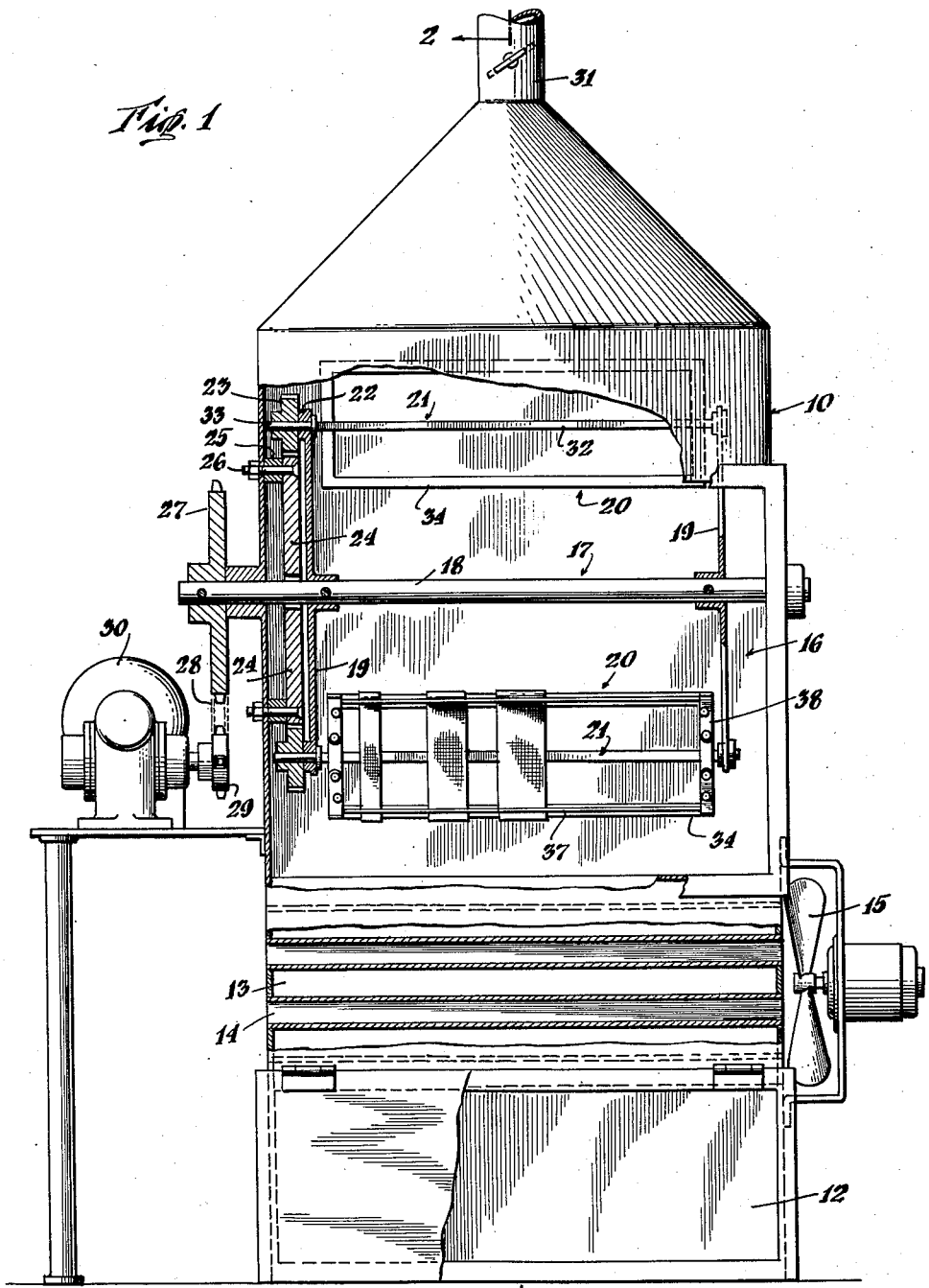
Figure 1 represents a front elevation of apparatus embodying the present invention with parts broken out and partly in vertical section.

Reading on the said drawings the apparatus comprises a housing 10, having a door 11, a bottom chamber 12, said bottom chamber 12, serving to introduce the gases into the testing apparatus. From the bottom chamber 12, the gases enter gas ducts 13, where the gases may be cooled to the desired temperature. The cooling of the gases is effected by air passing through air ducts 14, or by other cooling means. Air may be caused to pass through the air ducts 14 by a fan 15, which is so arranged as to blow or draw cool air through the air ducts 14 for cooling the gases prior to their entry into testing chamber 16. If desired the fan 15 may be thermostatically controlled. Within the testing chamber 16 is a carrier 17 comprising a main shaft 18 suitably journaled in the side walls of chamber 16. The carrier 17 is provided on both ends with discs 19, which are secured to the shaft 18. Between the discs 19, a number of rotatable testing frames 20 are arranged such that the frames 20 are substantially equiangularly disposed about the axis of rotation of the shaft 18 and the carrier 17.

Each one of the frames 20 is mounted upon a shaft 21 which is journaled in suitable bearings 22 in the discs 19, each shaft 21 carrying a planetary gear 23. All the gears 23 engage and mesh with a center stationary gear or sun gear 24, which is fixedly mounted to the wall of chamber 16 with spacers 25 and bolts 26. A sprocket wheel 27 is secured on the main shaft 18 and driven by chain 28 from drive sprocket 29 of a prime mover, such as a gearmotor 30. Gearmotor 30 may be of any conventional type and may be provided with means for reversing its direction of rotation automatically and periodically. As gearmotor 30 drives the carrier 17 at a predetermined speed, each of the frames 20 on the carrier 17 rotates around the axis of shaft 18, and also around the axis of its own shaft 21. As a result each of the samples "T" being tested will be evenly exposed to the testing gases within the chamber 16. Such even exposure of the samples "T" is also aided through reversing the direction of rotation of the samples "T" because the gases will strike both sides of the samples "T." Therefore the fading action of the gases on the samples "T" is also uniform. The gases after reaction with the samples "T" are vented through a stack 31.

The detailed construction of the carrier frame 20 may be as follows:

The center shaft 21 has a square portion 32 and round bearing pintle forming ends 33. The portion 32 carries a frame 34 which has V-shaped grooves 35 on its lateral sections. The frame 34 is held in shaft portion 32 by bolts 36. The samples "T" to be tested are laid over the frames 34 as indicated in Fig. 4 and are wedged at both their ends into the V-shaped grooves 35 by flat bars 37, which are kept tensioned by leaf springs 38 pivotally secured at 39 to the frame 34. Stop screws 40, which engage the sides of recesses in the springs 38 as shown in Figs. 4 and 5, serve to limit the lateral movement of the leaf springs 38, and urge bars 37 into grooves 35 to hold the samples "T" resiliently in position for testing. An automatic temperature control mechanism is designated 41, gas burners to supply products of combustion 42, and control valves for the burners 43. The temperature may be controlled as desired in the range between 70° F. and 160° F.

While I have illustrated but one embodiment of my invention, I do not intend to limit myself to those particular means, methods or materials, as it is apparent that other means, methods, and materials may be employed for obtaining the same results within the scope of the appended claims and without departing from the scope or spirit of my invention.

I claim:

1. Apparatus for testing the fading characteristics of textile material when exposed to gases, comprising a substantially closed housing, a rotating carrier mounted for rotation about a substantially horizontal axis and located within said housing, means for rotating said rotating carrier, a plurality of individual testing frames for carrying textile samples mounted on said rotating carrier for rotation in respect thereto respectively about substantially horizontal axes parallel with and spaced from the axis of rotation of said rotating carrier, means responsive to the rotation of said rotating carrier for rotating said testing frames in respect to said rotating carrier about their respective axis, apparatus associated with said housing for the generation of products of combustion, means for conducting products of combustion from the generating apparatus therefor to the interior of said housing, a plurality of cooling ducts disposed in the path of the products of combustion from said generating apparatus to said housing for controlling the temperature of the products of combustion at the time they are admitted to said housing for contact with samples of textile material on said testing frames, and means for the exhaust of products of combustion from said housing.

2. Apparatus in accordance with claim 1, comprising in addition, automatic temperature control means for controlling the temperature of the products of combustion as supplied to said housing.

3. Apparatus in accordance with claim 1, comprising in addition, automatic means for reversing the direction of rotation of said rotating carrier and said testing frames.

4. Apparatus in accordance with claim 1, comprising in addition an automatic timing device to regulate the driving means for reversing the rotation of the rotating carrier and testing frames.

5. An apparatus having in combination a housing, said housing having an upper and lower chamber, said upper chamber containing a door, said lower chamber having gas and air ducts, said gas ducts conducting gases, said air ducts being subject to the action of a fan, said gas ducts leading to the upper chamber, said upper chamber having a carrier, said carrier having a center shaft, said carrier being rotatable around said center shaft and having testing frames, said testing frames being rotatable about their own axis, said testing frames being adapted to carry textile samples, planetary gear means mounted to rotate said testing frames on rotation of said carrier, said upper chamber receiving gases from said ducts, means rotating said carrier in one direction and automatically reversing its rotation in the opposite direction, said upper chamber containing a stack for the escape of the gases.

6. An apparatus having in combination a metallic closed container having an upper and a lower chamber and having an exhaust through the top of its upper chamber, said lower chamber containing gas and air ducts, said gas ducts receiving gases and said gases being produced by means of burners beneath said gas ducts in said lower chamber and said gases passing through gas ducts, said gas ducts being cooled by the action of a fan, said lower chamber having an opening on both sides, one of said openings to receive a fan, the other said opening to permit the passage of air through said air ducts, the gases passing through said gas ducts being emitted to the upper chamber, said upper chamber having testing frames holding samples, said testing frames being rotatable around a central axis and having frames being rotatable about their own axis, planetary gear means mounted to rotate said testing frames on rotation of said carrier, and being subject to alternating action, substantially as described.

7. Apparatus for testing materials, comprising in combination, a housing having an upper and a lower chamber therein, a door for said upper chamber, means for supplying gases to said lower chamber, gas ducts for conducting such gases supplied to said lower chamber to said upper chamber, air ducts in heat transferring relation to said gas ducts for cooling gases passing therethrough, a fan for causing air to flow through said air ducts, a rotating carrier mounted in said upper chamber for rotation about a predetermined axis, means for rotating said rotating carrier, a plurality of testing frames mounted on and for rotation with respect to said rotating carrier, means deriving power from said rotating carrier rotating means for rotating said frames in respect to said rotating carrier, each of said testing frames being adapted to hold textile samples to be tested by exposure to gases supplied to the upper chamber of said housing, and a stack for the escape of gases from said housing.

8. Apparatus in accordance with claim 7, wherein said means for rotating said frames comprises a stationary sun gear secured to said housing concentric with said rotating carrier, and a plurality of planetary gears secured respectively to each of said testing frames and meshing with said sun gear.

9. Apparatus in accordance with claim 7, wherein said means for supplying gases to said lower chamber comprises at least one gas burner associated with said lower chamber, and valve means for controlling the supply of gas to each said burner, so as to generate products of combustion in said lower chamber as the gas supply thereto.

ROLF BERNEGGER.

References Cited in the file of this patent

UNITED STATES PATENTS

| Number | Name | Date |
| --- | --- | --- |
| 1,458,941 | Jameson | June 19, 1923 |
| 1,969,606 | Hall | Aug. 7, 1934 |
| 2,482,753 | Heineman | Sept. 27, 1949 |
| 2,510,952 | Brewster | June 13, 1950 |